United States Patent [19]
Hatamoto et al.

[11] Patent Number: 6,127,157
[45] Date of Patent: Oct. 3, 2000

[54] COATING MATERIAL

[75] Inventors: Osamu Hatamoto, Noda; Eiichi Nakano, Iwatsuki, both of Japan

[73] Assignees: Kikkoman Corporation, Noda; Noda Institute for Scientific Research, Chiba-ken, both of Japan

[21] Appl. No.: 09/297,504

[22] PCT Filed: Dec. 2, 1997

[86] PCT No.: PCT/JP97/04401

§ 371 Date: May 3, 1999

§ 102(e) Date: May 3, 1999

[87] PCT Pub. No.: WO98/24858

PCT Pub. Date: Jun. 11, 1998

[30] Foreign Application Priority Data

Dec. 3, 1996 [JP] Japan .................................. 8-336232

[51] Int. Cl.[7] .......................... C12N 9/08; C07D 311/78; C09D 5/02
[52] U.S. Cl. .......................... 435/192; 435/190; 435/189; 549/381; 549/414; 549/415; 106/287.23
[58] Field of Search ..................... 435/192, 190, 435/189; 549/381, 414, 415; 106/287.23

[56] References Cited

U.S. PATENT DOCUMENTS 5,470,874  11/1995  Lerner .
5,569,458  10/1996  Greenberg .

FOREIGN PATENT DOCUMENTS 61-16982   1/1986   Japan .
3-200781   9/1991   Japan .
06336419   12/1994  Japan .
08225453   9/1996   Japan .
08228685   9/1996   Japan .
WO 96/00561  1/1996  WIPO .

OTHER PUBLICATIONS

Oszmianski et al. Journal of Food Science, vol. 50, pp. 1505–1506, 1985.
CAPLUS abstract of Romanian Pat. No. 93,487 B1; Domide et al, Dec. 1987.

*Primary Examiner*—Francisco Prats
*Assistant Examiner*—Susan D. Coe
*Attorney, Agent, or Firm*—Banner & Witcoff, Ltd.

[57] ABSTRACT

The present invention provides a coating suitable for coating woods, and the coating is obtained by dissolving proanthocyanidine into water or a water-containing alcohol.

5 Claims, No Drawings

COATING MATERIAL

TECHNICAL FIELD

The present invention relates to a paint comprising proanthocyanidine.

BACKGROUND ART

Coating of wood is generally clear coating which is finished by directly expressing the quality and grain of the wood, and the main part of this coating art comprises the coating of furnitures. However, the coating of woods unlike that of metal materials has a disadvantage that such coating cannot be treated regularly due to the type of woods. That is, the properties of woods are distinguished from each other depending on the kinds of trees, the grains of the surface will vary depending on the sawings of woods, the stretching properties will vary depending on the directions of grains, and the tissues of the woods are uneven and thus result in different absorption of a coating.

On the other hand, the clear coating of woods had been started with oily varnish and lac varnish, and then a variety of synthetic coatings and coating methods have been developed by way of cashew coatings as an alternative of glue. Furthermore, the coloring methods with chemical agents have been practiced, but such coatings in the prior art often employ organic solvents, thus resulting in the inconvenience for their handling as well as environmental pollution. In addition, such coatings have also a problem that the coatings are malodorous not only during coating but also after coating, and that such coatings are hardly coated uniformly.

DISCLOSURE OF THE INVENTION

The object of the present invention is to provide a coating suitable for the coating of woods.

The present inventors have conducted examinations in order to solve the above described problems, and found that proanthocyanidine can be used as an oil stain-like coating.

Proanthocyanidine is known to have a variety of physiological activities such as anti-oxidation, anti-mutagenesis, cosmetically skin-whitening effect, arteriosclerosis-myocardial infarction preventing effect, vessel protecting effect, anti-tumor effect, angiotensin transferase inhibiting effect, anti-bacterial effect and deodorant effect, but no reports have been described about the use as a coating material.

BEST MODE FOR CARRYING OUT THE INVENTION

The present invention will be described specifically below.

Proanthocyanidines are the condensed type tannins present in various plant bodies, i.e. the compounds in which flavan-3-ol or flavan-3,4-diol as the constructing units are combined by condensation or polymerization. These compounds are referred to as proanthocyanidines because of the production of anthocyanidines such as procyanidine, delphinidine and pelargonidine by their treatment with acid. Proanthocyanidines such as procyanidine, prodelphinidine and propelargonidine, and their steric isomers which are the dimer, trimer, tetramer as well as decamer or higher polymer of the above described constituent units can be obtained by the extraction of a variety of plant bodies such as seeds of grape, cranberry fruit, apple fruit, soybean, or barks of cedar, Japanese cypress or pine tree.

These proanthocyanidines are commercially available, and include for example "KPA" (manufactured by Kikkoman Corp.) which is made from grape seeds, "APPLEPHENONE" (The Nikka Whiskey Distilling Co., Ltd.) made from the pre-mature fruit of apple, "PICNOGENOL" (Horphag Research Limited; GB), and the like.

These proanthocyanidines may be used as coating materials by dissolving proanthocyanidine into water or water-containing alcohol in a concentration of 0.1–10% and coating the solution by the conventional method, e.g. applying with brush or spraying with atomizer. Proanthocyanidine in the solution may be freely set up at a concentration of 0–100%, and the higher concentration solution may be obtained by warming the proanthocyanidine in water or aqueous alcohol due to the relationship of the solubility of proanthocyanidine. By way of example, proanthocyanidine is dissolved at a concentration of 0.1–10% in water or aqueous alcohol at an ordinary temperature, and at a concentration of 10–50% at 35–70° C.

The higher concentration solution may be coated more heavily, so that the proanthocyanidine may be dissolved and coated at an appropriate temperature depending on purposes. The coating is carried out one to several times in order to impregnate proanthocyanidine into the surface of a material to be coated. As the proanthocyanidine gradually permeates from the surface of the material to be coated into the inside, firm film is formed on the surface by its polymerization with ultraviolet rays.

While proanthocyanidine just coated on wood remains colorless and transparent, it absorbs ultraviolet rays and gradually turns darkened, and thus resulting in a pale brownish coating. The darkening is caused by the polymerization of proanthocyanidine.

Such polymerization mechanism is the same as that in glue, and good coating condition can be maintained over a longe period without peeling off of the coating.

Also, the post-treatment of a coating device can be readily done, since the solvent used is water or an alcohol. In addition, the coating material of the present invention may be also used in combination with the other aqueous coating materials.

The material to be coated includes woods, paper, fiber (thread), and the like. The coating material of the present invention can be coated particularly on woods for the coating with utilizing the grains, so that it is useful for the coating of the alcove post, a horizontal piece of timber, ceiling board, and the like as well as furnitures and indoor furnishings. It also improves the anti-corrosion and thus can be suitably applied to outer wall, gate, terrace or log house.

Also, when a proanthocyanidine solution is coated, the polymerization of proanthocyanidine can be further promoted by incorporating oxidase or peroxidase such as laccase, which may act on proanthocyanidine as a substrate, in the proanthocyanidine solution. As the laccase, there may be used the one that is secreted by *Pycnoporus coccineus,* a wood-rotting fungus, in a culture medium, and the method for producing it can be obtained by the method described in Japanese Patent Laid-Open Publication 6-287516.

In addition, laccase may be the one which is obtained by the method with use of a recombinant microorganism into which a laccase gene of Bacidiomycetes has been introduced by gene manipulation.

Furthermore, as the laccase may be used the one marketed for example from Funakoshi K.K., which is available if desired.

The amount of laccase added to the proanthocyanidine solution varies also depending on the concentrations of proanthocyanidine, and for example an enzyme solution having an enzyme activity of 250 U/ml may be added in an amount of 0.01–1% to the solution having the proanthocyanidine concentration of 0.2%.

Also, the proanthocyanidine solution can be turned into various colors by the co-existence of metal ions. For instance, the gray coating can be formed by the co-existence of an iron ion.

The coating material according to the present invention has the following effects:

(1) the coating having a natural grain of wood may be formed;

(2) a uniform coating may be formed;

(3) a material to be coated has an improved durability and hardly soiled;

(4) the coating will hardly fade;

(5) the coating absorbs ultraviolet rays to protect the grain of wood;

(6) a coating material having a constant composition of components may be supplied stably;

(7) the coating is odorless, and generates no harmful smoke upon burning of it, which is thus not deleterious;

(8) the coating contains no deleterious materials;

(9) the coating can be anticipated with having anti-bacterial effect; and

(10) the coating can be anticipated with having deodorant effect.

Examples are illustrated below.

EXAMPLE 1

Commercially available proanthocyanidine extracted from grape seeds ("KPA-40"; manufactured and marketed from Kikkoman Corp.) was dissolved in tap water to a concentration of 0.2% (A), 1% (B) and 5% (C) and coated on Japanese cypress boards with a brush.

Coating was repeated three times with every 10 minutes, then left standing by the window, and the coating condition was observed by the naked eye on 30 days after coating. The results are shown in Table 1.

TABLE 1

|         | Immediately after coating | 30 days after coating |
|---------|---------------------------|------------------------|
| A (0.2%) | Transparent, incapable of distinguishing whether it is coated or not | Colored slightly yellowish brown |
| B (1%)  | Slightly yellowish brown  | Colored pale yellowish brown |
| C (5%)  | Pale yellowish brown      | Colored brown          |

EXAMPLE 2

Commercially available laccase (enzyme activity: 250 U/ml; Funakoshi K.K.) was added in an amount of 0.1% to the same proanthocyanidine solution as used in Example 1. The resulting solution was coated in the same manner as in Example 1, the coated material were left standing, and the coating condition were observed on 7 days after coating. The results are shown in Table 2.

TABLE 2

|   | Immediately after coating | 7 days after coating |
|---|----------------------------|-----------------------|
| A | Transparent, incapable of distinguishing whether it is coated or not | Colored pale yellowish brown |
| B | Slightly yellowish brown | Colored slightly brown |
| C | Pale yellowish brown | Colored brown |

EXAMPLE 3

KPA-40 (manufactured by Kikkoman Corp.) was dissolved in hot water at 70° C. so as the concentration to be 20% (w/v) and 30% (w/v) and coated twice on pine tree boards, respectively. After first coating, these boards were subjected to natural drying for 30 minutes, then to second coating, and the excess of coating material was immediately wiped off with cloth to finish coating. The boards were left standing as such, and the coating states were observed. The results are listed in Table 3.

TABLE 3

|         | Immediately after coating | 30 days after coating |
|---------|---------------------------|------------------------|
| A (20%) | Deep yellowish brown      | Pale reddish brown     |
| B (30%) | Pale reddish brown        | Reddish brown          |

What is claimed is:

1. A process for treating wood, paper or fiber which comprises applying thereon, an aqueous composition containing an amount of 0.1 to 50% by weight of proanthocyanidine.

2. A process for treating wood, paper or fiber which comprises applying a composition thereon, said composition comprising proanthocyanidine, and oxidase or peroxidase which may act on said proanthocyanidine as a substrate.

3. A process for treating wood, paper or fiber which comprises applying a composition thereon, said composition comprising proanthocyanidine and laccase.

4. A process for treating wood, paper or fiber which comprises applying a composition thereon, said composition comprising proanthocyanidine, and oxidase or peroxidase which may act on said proanthocyanidine as a substrate, said proanthocyanidine dissolved at a concentration of 0.1–10% by weight in water or in an aqueous solution of alcohol at ambient temperature.

5. A process for treating wood, paper or fiber which comprises applying a composition thereon, said composition comprising proanthocyanidine, and oxidase or peroxidase which may act on said proanthocyanidine as a substrate, said proanthocyanidine dissolved at a concentration of 10–50% by weight in water or in an aqueous solution of an alcohol at a temperature of 35–70° C.

* * * * *

UNITED STATES PATENT AND TRADEMARK OFFICE
CERTIFICATE OF CORRECTION

PATENT NO.: 6,127,157

DATED: October 3, 2000

INVENTORS: Osamu HATAMOTO *et al.*

It is certified that an error appears in the above-identified patent and that said Letters Patent is hereby corrected as shown below:

On the cover page, in the title:

"COATING MATERIALS" has been replaced with --COATINGS--.

Signed and Sealed this

Twenty-second Day of May, 2001

*Attest:*

NICHOLAS P. GODICI

*Attesting Officer*     *Acting Director of the United States Patent and Trademark Office*